June 14, 1966 Y. GINSBURG 3,255,795
SELF-LOCKING NUT
Filed Jan. 10, 1964

*INVENTOR.*
YALE GINSBURG.
BY
ATTORNEY

3,255,795
SELF-LOCKING NUT
Yale Ginsburg, 12341 Burton, Oak Park, Mich.
Filed Jan. 10, 1964, Ser. No. 336,933
1 Claim. (Cl. 151—7)

This invention relates to fastening devices and more particularly relates to nuts constructed of relatively deformable material having an axial bore of which at least a portion is unthreaded.

Self-locking nuts have heretofore been suggested which are formed of a plastic or other relatively deformable material and are provided with an axial bore into which a threaded bolt or screw may be introduced. The axial bore is either partially or totally unthreaded. When the nut is screwed onto a threaded member such as a screw, the unthreaded walls of the nut along the bore are deformed to accommodate the screw threads. The elasticity of the nut material causes the deformed plastic material to fit tightly about the screw threads, thereby locking the nut in place upon the screw.

An unthreaded nut of this kind is adaptable for use with threaded members of various thread types and sizes. In each case, the thread impressed in the nut corresponds in size and shape to that of the bolt or screw. However, these bolts or screws often produce substantial stresses in the nut structure when the latter is screwed in place. These stresses are usually absorbed in the walls of the nut adjacent the deformed axial bore. When the bolt size is excessive, the stresses in the walls of the nut can cause a fracturing of the wall material.

A related problem associated with unthreaded or partially threaded nuts of this kind, is created by the shredding and chipping of the walls of the bore during the deformation of the walls. These shreds or chips of plastic are squeezed along the bolt threads as the nut is screwed onto the bolt. Although these chips contribute towards the locking action of the nut by increasing the frictional grip of the nut on the bolt, frequently the amount and size of these chips is excessive with a resultant jamming of the nut on the bolt or fracture of the nut structure.

It is the principal object of the present invention to provide an improved self-locking nut of this type which is resistant to the formation of excessive stresses in the bore walls, and the accumulation of chips or shreds between the bolt and the deformed walls of the nut.

A further object of the present invention is to provide an improved nut of this kind which is simple in construction and economical to fabricate.

In a preferred embodiment of the invention which will be subsequently described in detail, the nut is formed of a nylon or similar material and is provided with a pair of rectangular slots extending along the wall of the central bore parallel to the axis of the bore. When the nut is screwed onto a bolt or other threaded member, the slots permit a slight movement of the walls of the bore, thereby relieving the nut structure of a substantial portion of the stresses created by the deformation. Most of the shreds of nylon material are accumulated in the slots rather than along the threads of the bore and bolt; this decreases the likelihood of jamming the nut on the bolt.

This type of construction of the nut permits it to be used with a larger variety of threaded members of increased sizes without fracture or jamming. The nut may be constructed of any material having the requisite elastic deforming properties. The relief slots permit the use of materials which would fracture if employed in a conventional self-locking structure.

It can be seen that the present invention is extremely simple in design and that nuts may be fabricated according to the present invention with only slight modification of equipment presently employed to manufacture conventional self-locking nuts.

Other objects and advantages of the present invention will be more readily apparent from the following detailed description of two preferred embodiments thereof. The description makes reference to the drawings in which.

Figure 1:
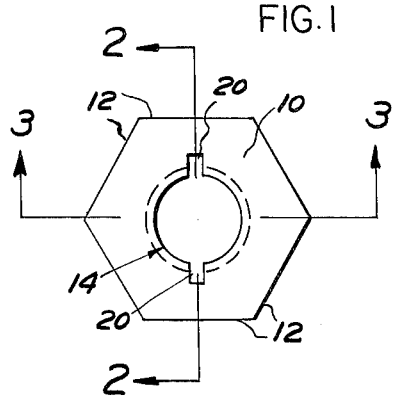
FIGURE 1 is a plan view of a first embodiment of the invention.
Figure 2:
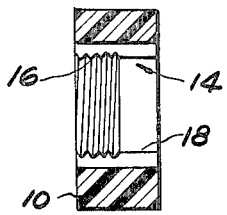
FIGURE 2 is a cross-sectional view taken along the lines 2—2 in FIGURE 1.
Figure 3:
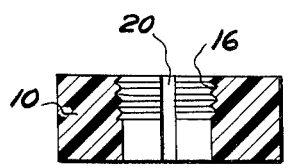
FIGURE 3 is a cross-sectional view taken along the lines 3—3 in FIGURE 1.

Referring to the drawings in detail, FIGURES 1–4 shows a first embodiment of the invention. The nut comprises a body 10 which is constructed of a readily deformable material such as nylon, plastic, brass, aluminum, or zinc. The body includes hexagonal sides 12 and an axial bore 14 extending through the body. The upper portion of the bore 14, as shown in FIGURE 2, includes threads 16. The root diameter of the threads 16 is greater than the diameter of the lower unthreaded section 18 of the bore.

A pair of slots 20 extend through the body adjacent the bore 14 at opposite points along the bore circumference. These slots 20 are formed by planes intersecting at right angles and extending parallel to the axis of the bore. The slots thus resemble keyways interrupting the threaded and unthreaded sections, 16 and 18, of the bore. The slots 20 extend beyond the roots of the threads 16 into the body 10 of the nut. Thus the slots 20 form continuous recesses extending the entire axial length of the bore 14.

Figure 4:
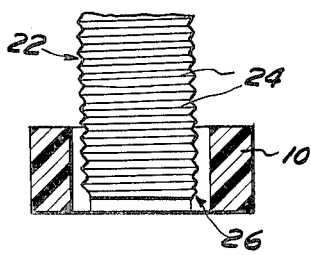
FIGURE 4 is the view of FIGURE 2 with a threaded bolt partially inserted along the unthreaded portion of the nut.

FIGURE 4 shows the manner in which a threaded member, namely a screw 22, impresses threads along the bore 14 of the nut. The screw 22 includes threads 24 which may or may not correspond to the threads 16 in the nut. If the threads 24 do so correspond, the nut may be easily screwed onto the screw 22 until the threads 24 abut the unthreaded section 18. At this stage considerable force must be applied, preferably with a wrench, to screw the nut further onto the screw 22. In doing so, the threads 24 cut into the smooth surface of the section 18 of the bore 14 and deform it into the shape of a matching thread as shown at 26. The chips and shreddings formed by this distortion of the walls of the bore are moved along the walls until they reach the slots 20 where they are then accumulated. The slots also serve to relieve part of the stress created in the bore walls by this deformation.

If the threads 16 of the nut do not match those of the screw 22, mounting of the nut on the screw will distort and deform the existing threads 16 until they correspond in size and shape to those of the screw 22. The chips and scrapings produced by this operation accumulate in the recesses 20. The unthreaded section 18 will subsequently be impressed with threads in the manner described above.

When the nut is forced onto the screw with the screw threads 24 cutting into the unthreaded section 18, the elasticity of the deformed nut material will cause the nut to lock about the screw. The nut may be subsequently removed or screwed further onto the screw only with the application of considerable force. This locking friction is supplemented to some extent by the chips and shreds not caught in the recesses 20.

The magnitude of the locking or friction force will obviously be dependent to a great extent upon the nature of the nut material. The relatively elastic materials such as nylon and plastic will lock more tightly about the threaded screw or bolt than will the less elastic metals such as brass and aluminum. Similarly, the more elastic materials will tend to retain their frictional grip upon repeated re-use of the nut, whereas the less elastic material will lose this self-locking feature after the first or second use.

Figure 5:
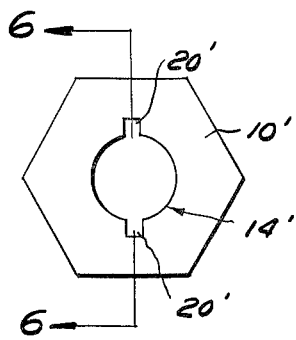
FIGURE 5 is a plan view of a second embodiment of the invention.
Figure 6:
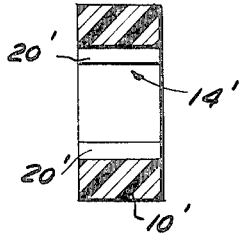
FIGURE 6 is a cross-sectional view taken along the lines 6—6 in FIGURE 5.

FIGURES 5 and 6 show a second preferred embodiment of the present invention. The nut body $10^1$ is provided with a completely unthreaded axial bore $14^1$. A pair of opposing slots $20^1$ extend along the bore $14^1$ parallel to the axis of the bore. This embodiment of the invention therefore is identical to that of FIGURES 1-4 in all details except for the elimination of the bore threads 16. When this nut is screwed onto a threaded member, the entire length of the bore is impressed with threads. The nut itself-locking in the same manner as described with respect to the first embodiment of the invention. The recesses $20^1$ are similarly operative to relieve stresses in the body $10^1$ and to accumulate chips of material.

Although the embodiments shown and described herein have employed a pair of oppositely disposed rectangular slots, it should be understood that any number of slots or recesses of any convenient configuration may be used. The shape and size of the recesses may be chosen in accordance with the forces created in the nut by the deformation of the walls of the bore. For example, it might be desirable to extend the slot or slots radially rather than axially along the bore.

The present invention may be employed in any fastener device in which a bore, at least partially unthreaded, is to be impressed with threads by an engaging threaded member. The latter member may be any threaded member, including members having stripped threads. The nut of the present invention is thus adaptable for use with members whose threads are so badly damaged as not to accept a conventional pre-threaded nut.

Having thus described my invention, I claim:

A self-locking nut, comprising: a body of relatively elastic material; a bore extending through said body and including a section threaded along a portion of its length, the balance of the bore consisting of a smooth cylindrical portion having a diameter less than the major diameter of the threads but not greater than the minor diameter of the threads; and a plurality of slots extending along the entire length of the bore, generally parallel to the bore axis, radially outward past the major diameter of said thread, and terminating radially within said nut body, so as to provide stress relieving recesses for the accumulation of chips and shreddings produced when threads are impressed on the unthreaded portion of said bore or said threaded portion is impressed with new threads.

References Cited by the Examiner
UNITED STATES PATENTS.

| | | | |
|---|---|---|---|
| 2,167,558 | 7/1939 | Upson | 85—46 |
| 2,286,667 | 6/1942 | Brooke | 151—7 |
| 2,393,323 | 1/1946 | Hungerford et al. | 151—7 |
| 2,410,995 | 11/1946 | Olson | 151—7 |
| 2,549,939 | 4/1951 | Shaw et al. | 151—7 |
| 2,983,180 | 5/1961 | Sygnator. | |
| 3,119,430 | 1/1964 | De Rico | 151—7 |

EDWARD C. ALLEN, *Primary Examiner.*